March 22, 1932.  F. L. O. WADSWORTH  1,850,088
ROOF STRUCTURE
Filed Dec. 14, 1926  4 Sheets-Sheet 1
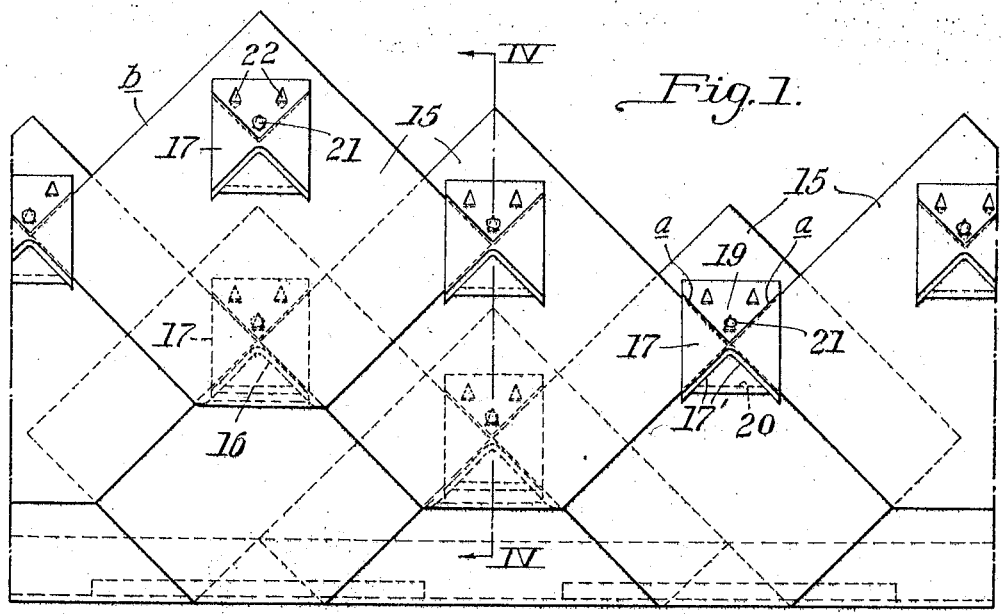
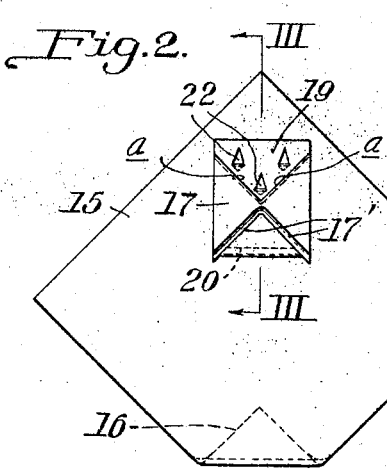
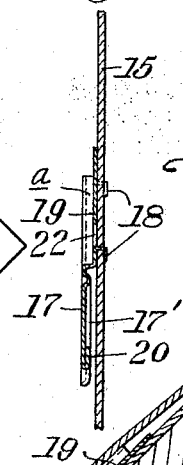
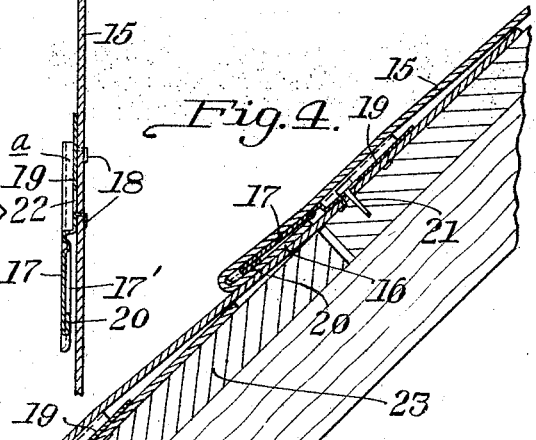
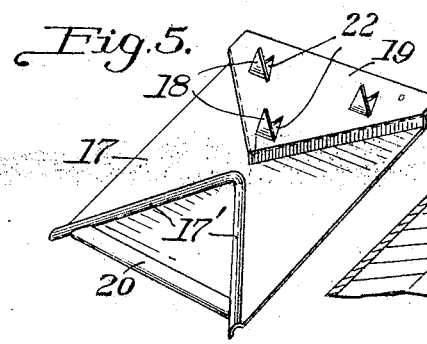
INVENTOR
Frank L. O. Wadsworth
By Archworth Martin
Attorney.

March 22, 1932.  F. L. O. WADSWORTH  1,850,088
ROOF STRUCTURE
Filed Dec. 14, 1926  4 Sheets-Sheet 2
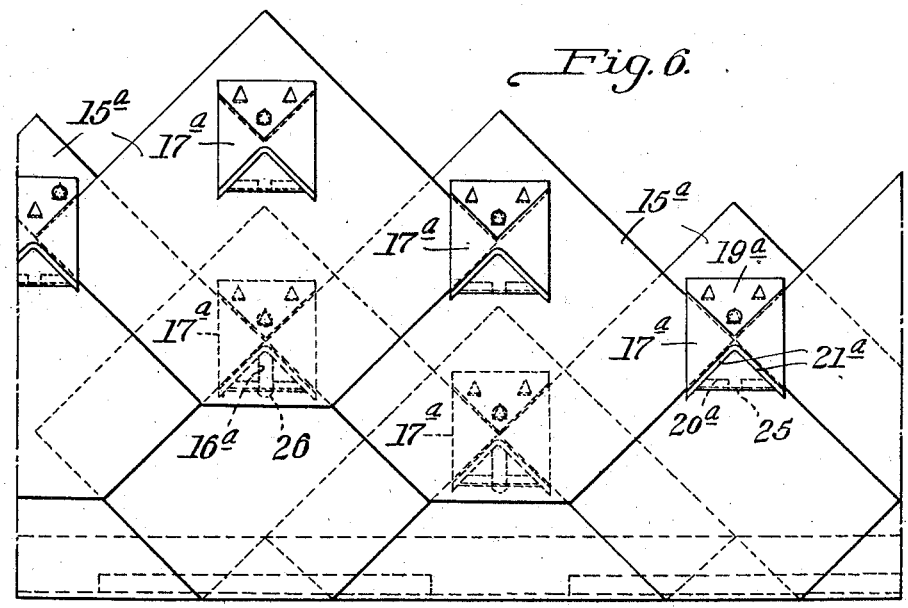
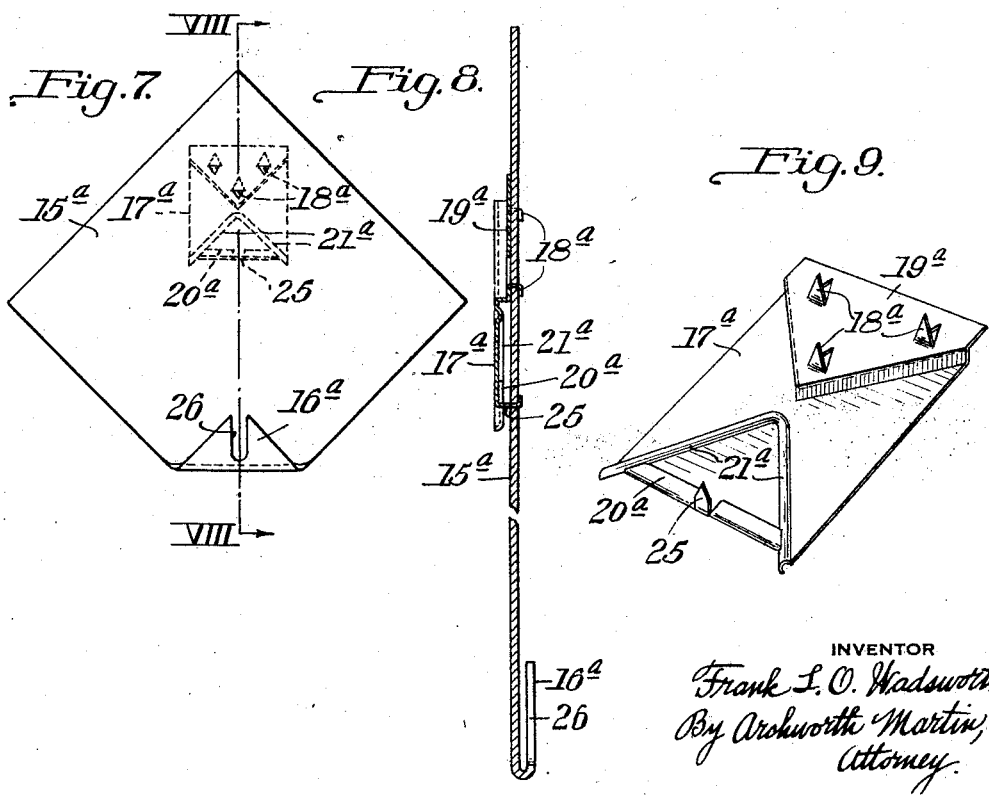
INVENTOR
Frank L. O. Wadsworth
By Archworth Martin,
Attorney.

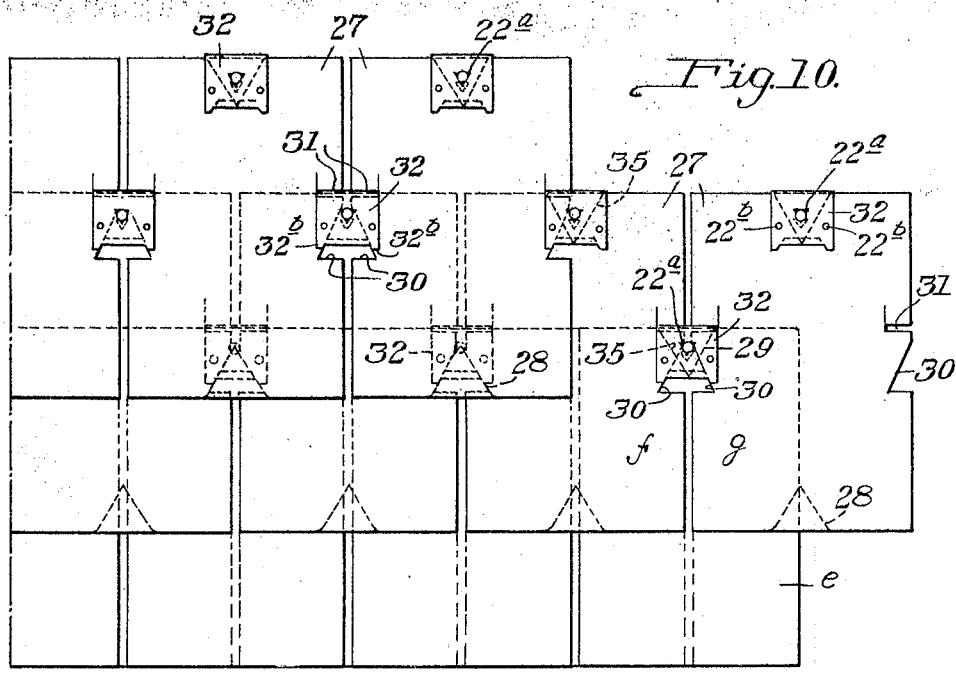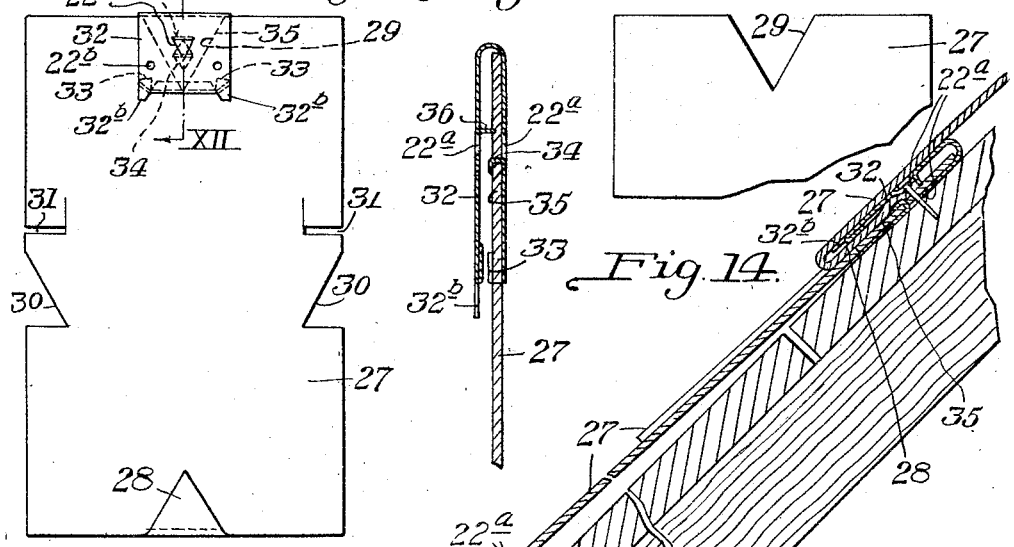

March 22, 1932. F. L. O. WADSWORTH 1,850,088

ROOF STRUCTURE

Filed Dec. 14, 1926 4 Sheets-Sheet 4

INVENTOR
Frank L. O. Wadsworth
By Archworth Martin,
Attorney

Patented Mar. 22, 1932

1,850,088

UNITED STATES PATENT OFFICE

FRANK L. O. WADSWORTH, OF PITTSBURGH, PENNSYLVANIA

ROOF STRUCTURE

Application filed December 14, 1926. Serial No. 154,681.

My invention relates to roof structures, and more particularly to those provided with shingle coverings.

My invention has for one of its objects the provision of means for locking down the projecting ends of each shingle, to prevent warping or lifting thereof under the effect of weather conditions, wind pressure, etc.

Another object of my invention is to so hold each shingle that it shall be free to expand and contract freely under varying climatic conditions, without becoming loosened from the roof boards or their supports, thus avoiding distortion or injury thereto under extreme changes in temperature, shrinkage or warping of the roof boards, etc.

Another object of my invention is to provide a roof composed of shingles and fastening devices therefor of such form that each fastening device may be secured to a shingle at the factory, in such manner that a workman, when he receives the shingles at the place of installation, can readily assemble the same in exactly the proper relative alinement.

Another object of my invention is to provide shingles and fastening devices of such form that they can be more compactly and firmly assembled than is possible with some of the forms of shingles heretofore employed.

Another object of my invention is to provide a shingle roof of such form that a smaller number of nails is required to hold the shingles in place than in the case of structures of the prior art.

Still another object of my invention is to provide an arrangement of shingles and holding clips whereby no bending or distortion of the shingles is required when assembling them to form a roof.

A further object of my invention is to simplify and improve shingle roof structures generally.

Figure 16:
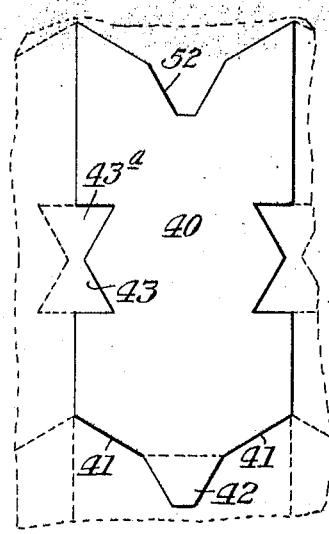
Figure 17:
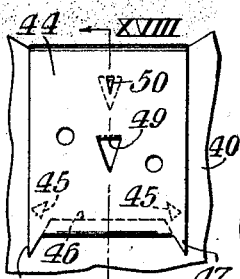
Figure 15:
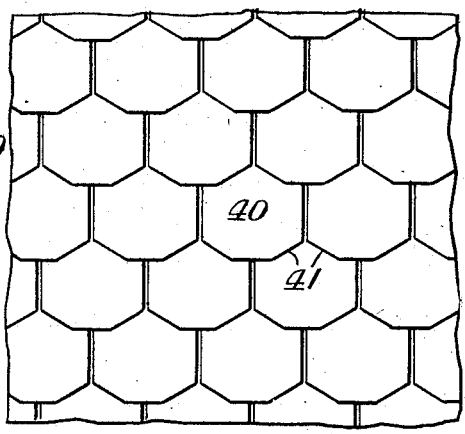
Figure 18:
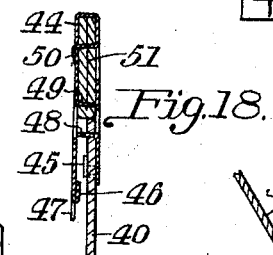
Figure 19:
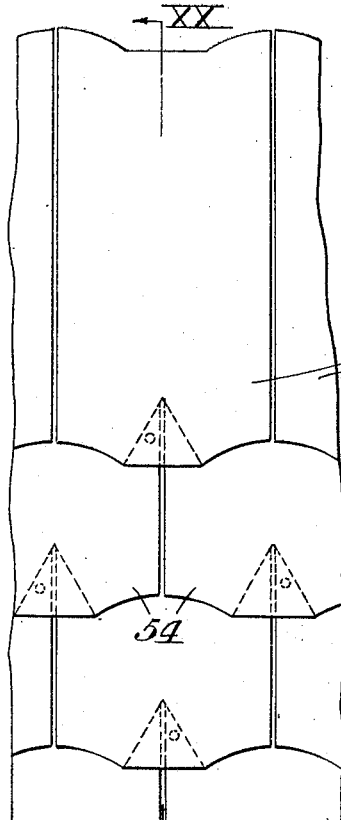
Figures 20, 21, 22, 23:
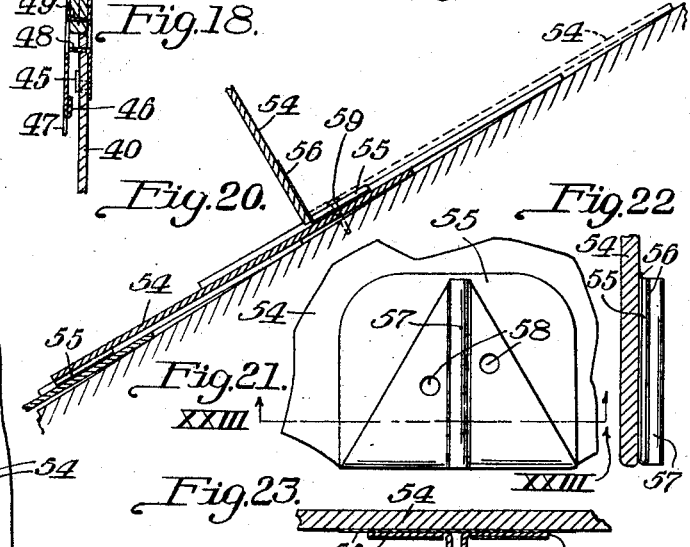
Figures 24, 25:
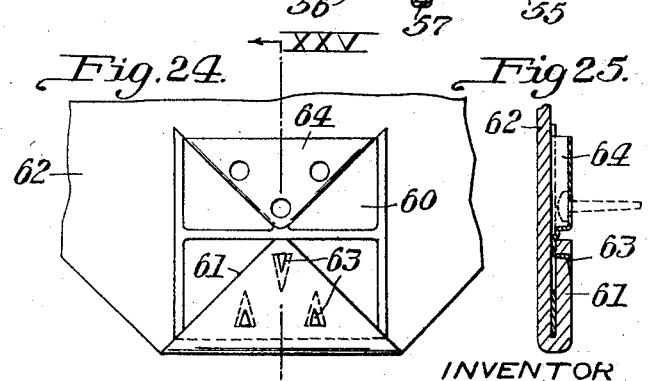

Some of the forms which my invention may take are shown in the accompanying drawings wherein Figure 1 is a plan view of a portion of a roof constructed in accordance with my invention; Fig. 2 is a plan view of one of the shingles of Fig. 1, together with its nailing clip; Fig. 3 is a view taken on the line III—III of Fig. 2, but on an enlarged scale; Fig. 4 is a view, on an enlarged scale, taken on the line IV—IV of Fig. 1; Fig. 5 is an inverted plan view of the nailing strip or clip of Fig. 2; Fig. 6 is a plan view of a portion of a roof made up of shingles and nailing clips of a modified form; Fig. 7 is an inverted plan view of one of the shingles of Fig. 6; Fig. 8 is a view taken on the line VIII—VIII of Fig. 7; Fig. 9 is an inverted plan view, on an enlarged scale, of one of the nailing clips of Fig. 6; Fig. 10 is a plan view of a portion of a roof constructed of shingles and nailing clips of still another form; Fig. 11 is a plan view, on an enlarged scale, of one of the shingles of Fig. 10; Fig. 12 is a view, on a still further enlarged scale, taken on the line XII—XII of Fig. 11; Fig. 13 is a view showing a portion of one of the shingles of Fig. 10 previous to the application of the nailing clip thereto; Fig. 14 is a transverse sectional view of the structure of Fig. 10, on an enlarged scale; Fig. 15 is a plan view of a portion of a roof made up of shingles of still another form; Fig. 16 is a plan view of one of the shingles of Fig. 15, and indicating diagrammatically the manner in which a plurality of the shingles are cut from a single sheet of material without waste; Fig. 17 is a view, on an enlarged scale, of a portion of a shingle of Fig. 16 with a nailing clip attached thereto; Fig. 18 is a view taken on the line XVIII—XVIII of Fig. 17; Fig. 19 is a plan view of a portion of a roof structure of shingles of still another form; Fig. 20 is a sectional view of the structure of Fig. 19, but showing one of the shingles in extended position, before it is folded down; Fig. 21 is an inverted plan view of a portion of one of the shingles of Fig. 20, on an enlarged scale; Figs. 22 and 23 are sectional views of the structure of Fig. 21; Fig. 24 is an inverted plan view showing another form of nailing clip, and Fig. 25 is a view taken on the line XXV—XXV of Fig. 24.

Referring now to the form of device shown in Figs. 1 to 4, I provide shingles 15 which will usually be of flexible material, such as one of various well known roofing compositions. Each shingle has its lower corner 16 bent inwardly to form an underlying fold, so that it may interlock with the nailing strip or clip 17 of an adjacent shingle, in a manner to be hereinafter described. The nailing strips or clips 17 are preferably of sheet metal and are provided with struck-out tongues 18 that are forced through the shingle and bent back, to function as rivets for holding the nailing strips in place upon the shingle, from the time it leaves the factory until it has been finally installed in a roof. The upper end of the nailing strip 17 has a depressed portion 19, as shown more clearly in inverted plan view in Fig. 5. This depressed portion is indicated at $a$—$a$ in Fig. 1. The lower end of the clip 17 is folded back as at 20 to stiffen the same and to serve as a guide for the turned back corner 16 of a superposed shingle. Ribs 17' are stamped into the metal clip in the process of manufacture and serve to stiffen the clip 17 and act as guides for the corners of shingles that extend beneath the clip.

Each shingle 15 that lies above the starting course or lower row of shingles, at the eave of the roof, is provided with a clip or nailing strip 17, so that they are duplicates of one another. In assembling the shingles, a shingle $b$, for example, is drawn into position by sliding its tongue 16 under the lower edge of a nailing strip 17, and its upper diagonal edges are brought against the edges of the depressed portions 19 of the nailing strips 17 of two previously applied shingles. The shingle $b$ is therefore automatically guided to proper position. A nail 21 will then be driven through one of the openings 22 left by the struck out tongues 18 of the nailing strip, to secure it to the wooden sheathing 23 of the roof. The said openings provide a plurality of selective nailing holes, so that in case one of them lies opposite to a crack in the sheathing 23, the nail 21 can be driven through one of the other holes. It will be seen that each nailing strip will be held in place by a single nail and that each nail serves to secure the overlapping portions of four adjacent shingles to the sheathing.

It will also be seen that the heads of the nails lie within the depressed portions of the nailing strips 17, so that they do not form protuberances which may damage the shingles of successive courses, nor cause the shingles above the same to bulge.

Referring now to Figs. 6 to 9, I show an arrangement of shingles and holding clips similar to that shown in Figs. 1 to 5. In this form of device, the nailing strips or clips 17$a$ are provided with depressed portions 19$a$, tongues 18$a$, and stiffened ribs or channels 21$a$, that correspond to the parts 19, 18 and 17' of Fig. 5, and function in the same manner. However, instead of simply folding back the lower edge 20$a$ of the nailing strip of Fig. 9, a tongue 25 is struck up from said edge, so that it may be driven into the shingle, as shown more clearly in Fig. 8. The shingles 15$a$ are also of somewhat different construction, in that the back-turned corner 16$a$ is slotted, as indicated at 26, so that when the shingle 15$a$ is drawn into position, the tongue 25 will serve as a guide for centering and holding the lower edge of the shingle in proper position, thus supplementing the guiding and positioning feature of the depressed portions 19$a$ of the nailing strips.

In this latter form of device, as in the device of Figs. 1 to 5, the nail heads do not protrude, and such heads as well as the nailing strips themselves are entirely covered and protected by a superposed course of shingles.

In Figs. 10 and 14, I show an arrangement whereby the shingles are laid in rectangular formation relative to the edges of the roof, in accordance with what is known as the "American system" instead of laid in the French system shown in Figs. 1 to 9. Each shingle is of such a form that a plurality of such shingles can be cut from a single large sheet of material, without any waste. Each shingle 27 is provided with an inwardly bent tongue 28 at its lower end and with a V-notch 29 (Fig. 13) at its upper end, the V notch in one shingle occurring as the result of the formation of the tongue 28 on an adjacent shingle. Each shingle is provided with angular notches 30 and slots 31 in its longitudinal edges. The nailing strips comprise sheet metal members 32 that are folded over the upper edges of the shingles and over the notches 29 and whose lower edges are turned back to permit tongues 28 to be more easily slid into place the projecting corners 32$b$ serving as guides for the edges of the tongues. The rear corners of each nailing strip are turned up as indicated at 33 and extend through the body of the shingle 27 to hold the nailing strip in place upon the shingle. An intermediate tongue 34 that is struck up from the body of the nailing strip serves to hold a filling piece 35 in place in the notch 29 such filling piece comprising material that is formed by the cutting of two notches 30 in adjacent edges of two shingles during the formation of such shingles.

A similar tongue 36 is struck down from the upper fold of the nailing strip 32 and serves to not only supplement the action of the opposite lower tongue but to also provide a nail hole 22$a$.

As above stated each shingle 27 has a clip 32 secured thereto. The clips 32 are provided with the nail holes 22$a$ formed by striking out the tongues 34 and 36 and also with auxiliary nail holes 22$b$ which may be used when the opening 22$a$ comes over a crack or knot hole in the roof boards. The clip of each shingle, $e$ for example, has interlocking engagement with the edges of two adjacent shingles $f$ and $g$ which partially overlie the shingle $e$; the edges of the clip 32 at its line of fold extending into the slits 31 of adjacent shingles. In placing another shingle upon the shingles *f* and *g*, such shingle will be pushed upwardly to bring its lower inwardly turned tongue beneath the clip last referred to; the slits 31 permitting the notched edges to be slipped under the adjacent clips that are carried by the shingles *f* and *g*.

The turned-back tongue of the shingle will snugly fit into the triangular recess formed by the cut-out portions 30 of the shingles *f* and *g*. Each shingle is thus held down at four points: at its lower end, by inter-engagement between its tongue 28 and a clip 32; at its edges, by inter-engagement between its slotted portions and two clips 32, and at its upper end by a nail which is driven through its attached clip.

It will be noted that only one nail is required to each shingle in all of the forms herein shown, and that each shingle is so engaged by the clips that it is left free to expand and contract, without buckling and warping, under changes in climatic conditions. The turned under edges 20 and 20*a* of the holding down clips, prevent their edges from projecting into snug engagement with the bends of the turned-under folds of the superimposed shingles, thus not only preventing any cutting or penetration of the fold when the shingles are pushed in place, but also leaving a clearance between the edge of the clip and the said fold that allows perfect freedom of expansion and contraction due to changes in temperature or to the shrinkage of the roof boards or to other causes.

Referring now to Figs. 15 to 18, I show a roof structure of shingles of such form that it resembles, in some respects, roofs made according to both the American system and the French system, and having nailing clips of different form than those shown in the other views. The shingles 40 are of the form shown in Fig. 16, and a plurality of these shingles are cut from a single sheet of material, as indicated by the dotted lines, so that there will be little or no waste result by reason of the peculiarly irregular contour of the shingle. The lower corners of the shingle are cut away as indicated at 41, leaving a projecting tongue 42 which is folded back, to lie within a substantial triangular recess 43, that will be found at the edges of two adjacent shingles upon which the shingle 40 will be placed, thus causing the shingles to snugly contact with one another.

The upper end of each shingle is secured to the roof boards by a nailing clip 44 that consists of a metal strip folded as shown more clearly in Fig. 18. The nailing strip is folded over the upper edge of the shingle and has tongues 45 struck up from its rear side and extending through the shingle. The front flap of the nailing clip 44 has a portion of its edge turned back, as indicated at 46 and projecting corners 47 so that the tongue 42 of a superimposed shingle will be guided into position when placing the same. Tongues 48 and 49 are struck up from the rear and the front portions, respectively, of the nailing clip to provide a nail hole. The tongue 49, together with a tongue 50, serves to hold a filling piece 51 in place in the clip, the filling piece 51 being of generally triangular form and composed of material cut from the shingles at 43 and 43*a*, and folded. The rear half of the filling piece fits within the cut out portion 52 of the shingle, that results from the formation of a tongue 42 of an adjacent shingle. The upper half of the filling piece 51 is, of course, of thickness equal to the thickness of the tongue 42, so that the fold of the nailing clip 44 is completely filled, as shown in Fig. 18.

In Figs. 19 to 23, I show a structure wherein nailing clips are secured to the lower ends of the shingles instead of to the upper ends thereof. In this arrangement, shingles 54 are provided with nailing clips 55 that are secured to the shingles by means of fabric strips 56. One portion of the fabric strip is glued or cemented to the under surface of shingle 54 and the other end thereof is glued to the outer surface of the nailing clip. The nailing clip is provided with a rib 57 that lies between the edges of adjacent shingles. Holes 58 are provided, through which nails 59 may be driven to fasten the clip to the roof boards.

In applying a shingle, the clip 55 is nailed to the roof as shown in Fig. 20, and the shingle then folded down from the position shown in Fig. 20 to that shown in Figs. 16 and 22. By this arrangement, it is unnecessary to form tongues on the shingles as in the other figures, although I may prefer to cut the upper and lower edges of the shingle to a contour somewhat as shown in Fig. 16, in order to enhance the appearance of the roof.

In Figs. 24 and 25, I show an arrangement wherein a clip 60 is secured to the turned back corner 61 of a shingle 62, by means of tongues 63 which are struck up from the body of the clip. The upper portion of the clip has a triangular depression 64 which is of a depth substantially equal to the thickness of the turned back corner 61 of the shingle, so that such portion of the clip will lie snugly on the roof board and can be nailed thereto without deformation of the clip. The angularly disposed edges of the depression 64 serve as guides for positioning the shingle with respect to shingles disposed therebeneath as in the case of the edges *a—a* of Figs. 1 and 2. In applying the shingle 62, the clip 60 will be nailed to the roof in the manner indicated in Fig. 20 and the shingle then bent down against the roof.

I claim as my invention:—

1. The combination with a shingle provided with an underlying fold, of a clip permanently secured thereto to form therewith a unitary article of manufacture; the said clip being provided with one substantially flat portion adapted to engage one shingle and another substantially flat portion spaced therefrom by an amount approximately equal to the shingle thickness and adapted to cooperatively engage the edges and the adjacent upper faces of two other shingles disposed on opposite sides of the said clip and to also engage the underlying fold of an overlying shingle.

2. A roofing structure comprising a series of rows of successively superimposed shingles, each of the said shingles being provided with a clip permanently secured thereto within the marginal lines thereof and having a portion offset therefrom by an amount substantially equal to the shingle thickness, the said offset portion being provided with a plurality of relatively shallow vertical stiffening ribs and being adapted to engage and hold down the adjacent shingles of at least two superimposed layers.

3. As a new article of manufacture, a shingle provided with a clip permanently attached thereto and positioned within the marginal lines thereof, the said clip being provided with a single offset portion separated therefrom by a space substantially equal to the shingle thickness and provided with a plurality of stiffening ribs and a reinforced lower edge.

4. As a new article of manufacture, a shingle provided with an under-turned portion forming a part thereof, and a clip permanently attached to a median portion of the said shingle and provided with an offset portion spaced therefrom by a distance equal to the shingle thickness, the offset portion of the said clip being formed with a plurality of relatively shallow stiffening ribs and having a turned back edge adapted to engage the under-turned portion of a superimposed shingle.

5. The combination with a shingle, of a clip, means for securing said clip to the top surface of the shingle to form therewith a unitary article of manufacture, the said clip being located within the marginal lines of the shingle and being provided with an offset portion adapted to receive and hold down the edge portions of two other shingles and to interlock with an underlying fold of another overlying shingle.

6. A roofing structure comprising shingles and clips secured to said shingles to form therewith unitary articles of manufacture, means for securing said clips and shingles to a supporting structure, the said clips each being located within the marginal edges of said shingles and being provided with an offset portion for cooperatively engaging the edges and upper surfaces of two of the said shingles and an under-turned part of another of the said shingles, whereby the clips themselves are completely covered and concealed.

7. A roofing shingle having a clip secured thereto as a unitary part thereof, the said clip being located within the marginal lines of the shingle, and being provided with a single offset portion adapted to engage and hold down adjacent portions of two successively applied layers of superimposed shingles.

8. A roofing shingle having a clip secured thereto to form a unitary structure therewith, the said clip being located within the lateral boundaries of the shingle and provided with an offset portion that is spaced therefrom by an amount substantially equal to the shingle thickness and is adapted to overlie and hold down the adjacent portions of two superimposed shingles and to also interlock with and hold down an underturned portion of a third shingle superimposed on the two last-named shingles.

In testimony whereof I, the said FRANK L. O. WADSWORTH, have hereunto set my hand.

FRANK L. O. WADSWORTH